United States Patent [19]
Filimon et al.

[11] Patent Number: 5,678,202
[45] Date of Patent: Oct. 14, 1997

[54] COMBINED ANTENNA APPARATUS AND METHOD FOR RECEIVING AND TRANSMITTING RADIO FREQUENCY SIGNALS

[75] Inventors: Cristian C. Filimon, Los Gatos; Stephen M. Jacobs; Anand Gundavajhala, both of Cupertino, all of Calif.

[73] Assignee: Plantronics, Inc., Santa Cruz, Calif.

[21] Appl. No.: 771,573

[22] Filed: Dec. 20, 1996

Related U.S. Application Data

[63] Continuation of Ser. No. 448,720, Jun. 8, 1995, abandoned.
[51] Int. Cl.$^6$ .............................. H04B 1/034; H04B 1/18
[52] U.S. Cl. .................... 455/89; 455/90; 455/100; 455/129; 455/277.1; 455/289; 343/718
[58] Field of Search .................... 455/89, 90, 100, 455/107, 129, 278.1, 289, 277.1; 343/702, 700 MS, 718

[56] References Cited

U.S. PATENT DOCUMENTS

| | | | |
|---|---|---|---|
| 4,181,889 | 1/1980 | Davis et al. | 455/129 |
| 4,975,711 | 12/1990 | Lee | 343/767 |
| 5,170,173 | 12/1992 | Krenz et al. | 343/702 |
| 5,335,368 | 8/1994 | Tamura | 455/90 |
| 5,337,061 | 8/1994 | Pye et al. | 343/702 |

OTHER PUBLICATIONS

H. E. King, "Characteristics of Body-Mounted Antennas for Personal Radio Sets", *IEEE Transactions on Antennas and Propagation*, Mar. 1975, pp. 242-244.

M. David Sullivan, "A Human Plate Antenna", *RF Design*, rfi/emc corner, Apr. 1990, pp. 52-58.

*Primary Examiner*—Chi H. Pham
*Attorney, Agent, or Firm*—Fenwick & West LLP

[57] ABSTRACT

An antenna system and method for use in a portable unit of a wireless telephone headset, wireless telephone headset adapter, or other telecommunication device combines a capacitive coupling antenna with an electric field sensitive antenna. The electric field sensitive antenna, such as a monopole antenna, receives and transmits RF signals when the portable unit is located remote from the user. A patch antenna receives and transmits RF signals when the portable unit is located proximate to, for example is worn by, the user. The patch antenna is a conductive surface for capacitively coupling to a user's body which acts as a radiating and receiving medium. Both the patch antenna and monopole antenna are coupled to an antenna port by matching circuits to tune each antenna for desired RF characteristics. When worn by the user, the RF effects of the monopole antenna are negligible and the patch antenna operates as the primary antenna. When located remotely from the user, the patch antenna will not be capacitively coupled to a body and the RF effects will be negligible as compared with the RF effects of the monopole antenna. The portable unit of a wireless headset receives and transmits signals when the portable unit is located either proximate to the user or remote from the user.

14 Claims, 4 Drawing Sheets

COMBINED ANTENNA APPARATUS AND METHOD FOR RECEIVING AND TRANSMITTING RADIO FREQUENCY SIGNALS

This is a continuation of application Ser. No. 08/448,720 filed on Jun. 8, 1995, abandoned.

BACKGROUND OF THE INVENTION

1. Field of the Invention

This invention relates to antennas for radio frequency (RF) communication devices and more particularly to a portable unit RF antenna adapted when located near a body and away from a body.

2. Description of the Related Art

Some conventional wireless communication devices have subsystems including a base unit and a portable unit (remote unit). The base unit is connected to a communication port such as a telephone line (for headset telephones) or to the handset port of a telephone (for headset telephone or receives an RF signal via conventional means. The portable unit communicates with an associated base unit using an RF link.

Wireless headset telephones (WHT) and wireless headset telephone adapters (WHTA) are two such wireless communication devices. WHT and WHTA portable units typically use short monopole antennas to send and receive electromagnetic signals to and from the base unit. WHT and WHTA portable units are often worn by the user in a pocket or clipped to a belt and thus are often positioned proximate to the user's body. Because the human body has finite dielectric properties, the body, when located proximate to the short monopole antenna, affects the electromagnetic field radiation pattern of the antenna and its matching circuit. Generally, the electric field strength of a short monopole antenna decreases as it approaches the body. Such a reduction in the strength of the electric field reduces the communication range of the portable unit.

Cordless telephones are another example of wireless communication devices employing a base and portable unit. Cordless telephones conventionally use a long monopole antenna on the portable unit (in this case the handset) to send and receive RF signals to and from the base unit when the portable unit is held proximate to the user. The long monopole antenna extends past the user's head, positioning the antenna a sufficient distance away from a user to reduce the adverse effects of the user's body on the electromagnetic field radiation. Long monopole antennas however, are not desirable for use in certain portable unit applications, such as with a WHT or WHTA portable unit, because such antennas are cumbersome to the user, are easily damaged or broken, and have an undesirable appearance.

Other conventional cordless telephones use a magnetic loop antenna in combination with a long monopole antenna. Such a combination yields a desired radiation pattern when located proximate to the body. A loop antenna, however is impractical in applications where a small antenna size is desirable because the loop must be relatively large, especially at low frequencies. Also, during normal operation the plane of the loop should be perpendicular to the surface of the body making the loop impractical for thin enclosures as are normally used in many portable units. Additionally, these combined antennas are designed for use only when proximate to the body and thus have undesirable radiation patterns when used away from the body.

Advances in microelectronics and the miniaturization of electronic devices have enabled the design of multi-mode portable devices designed for use in more than one operating environment. It is desirable to have a portable unit that is operable when positioned proximate to a body, for example when placed in a user's pocket, and that is also operable when positioned away from the user, such as when placed on a freestanding support or in the cradle of the base unit.

Some conventional cordless telephones obtain dual mode operation using one antenna for use when proximate to a user's body and another antenna for use when located away from the user. Both antennas are coupled to a common port and are switched using active circuitry or using a mechanical switching mechanism. The use of active circuit switching is undesirable due to their increased space requirements, manufacturing cost, and power consumption. The use of a mechanical switching mechanism is similarly undesirable due to space, cost, and reliability considerations. Another drawback of such conventional cordless telephones is that the antenna, when proximate to the user, must extend away from the user a sufficient distance to avoid the proximity effects of the user's body. It is desirable to have such multi-mode operation without the need for any active electrical or mechanical switching and without requiring antennas on the portable unit that physically extend away from a body to avoid the proximity effects of the body.

Thus, there is a need for a portable-unit antenna that transmits and receives RF signals when located proximate to a body and when located remote from a body without requiring an antenna to extend away from the body and without requiring active switching between two antennas.

SUMMARY OF THE INVENTION

In accordance with the present invention, there is provided a combined antenna system for receiving and transmitting electromagnetic signals. The antenna system is suited for wireless communication devices having a portable unit when the portable unit is located remote from a user as well as when in close proximity to a user. The antenna system has two antennas including a first antenna that dominates when the portable unit is located proximate to the user, and a second antenna that dominates when the portable unit is located remote from the user. Both antennas are coupled to a common antenna port using matching circuits that match the impedance of each antenna to the load. The first antenna is a patch antenna for capacitively coupling to the user's body when the portable unit is proximate to the user. In one embodiment, the patch antenna is a rectangular piece of conductive foil mounted to the back panel of the portable unit. The antenna system has a second antenna sensitive primarily to the electric field component of the electromagnetic signal. In one embodiment, the electric field sensitive antenna is a monopole antenna. When the antenna system on the portable unit is located away from the user, the monopole antenna dominates and the patch antenna effects are negligible. Conversely, when the antenna system on the portable unit is located proximate to the user, the patch antenna dominates and the monopole antenna effects are negligible, thereby obtaining a passive switching of the patch and monopole antennas. In one embodiment, the matching circuit associated with the monopole antenna has serially coupled inductors coupling the antenna and the antenna port. In this embodiment, the inductors are also capacitively coupled to ground. In another embodiment, the matching circuit associated with the patch antenna is a serially coupled inductor.

DESCRIPTION OF THE PREFERRED EMBODIMENT

Figure 1:
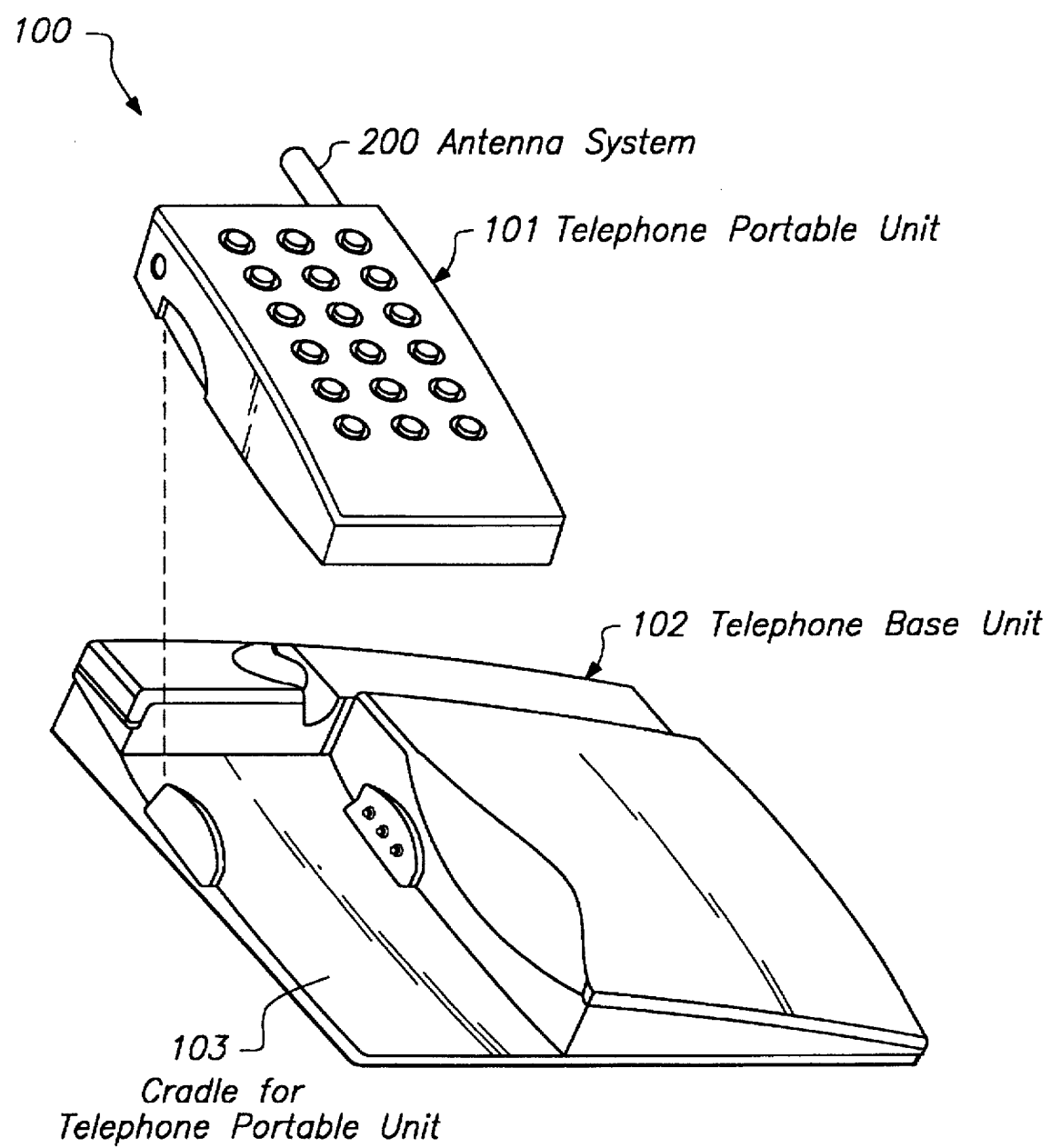
FIG. 1 is an exploded pictorial illustration of a communication device having a portable unit and a base unit in accordance with the present invention.

There is illustrated in FIG. 1, an exploded view of a communication device 100 in accordance with the present invention. Communication device 100 is a wireless headset telephone having a base unit 102 and a portable unit 101 that communicate using an RF link. A headset, not shown, housing a microphone and speaker may be electrically coupled to portable unit 101 via a connecting cable, or such microphone and speaker may be housed in the portable unit 101 within the downward-facing surface. Portable unit 101 may be worn by a user, for example, carried in a user's pocket or clipped to a user's belt or stored in the cradle 103 of base unit 101.

Figure 2:
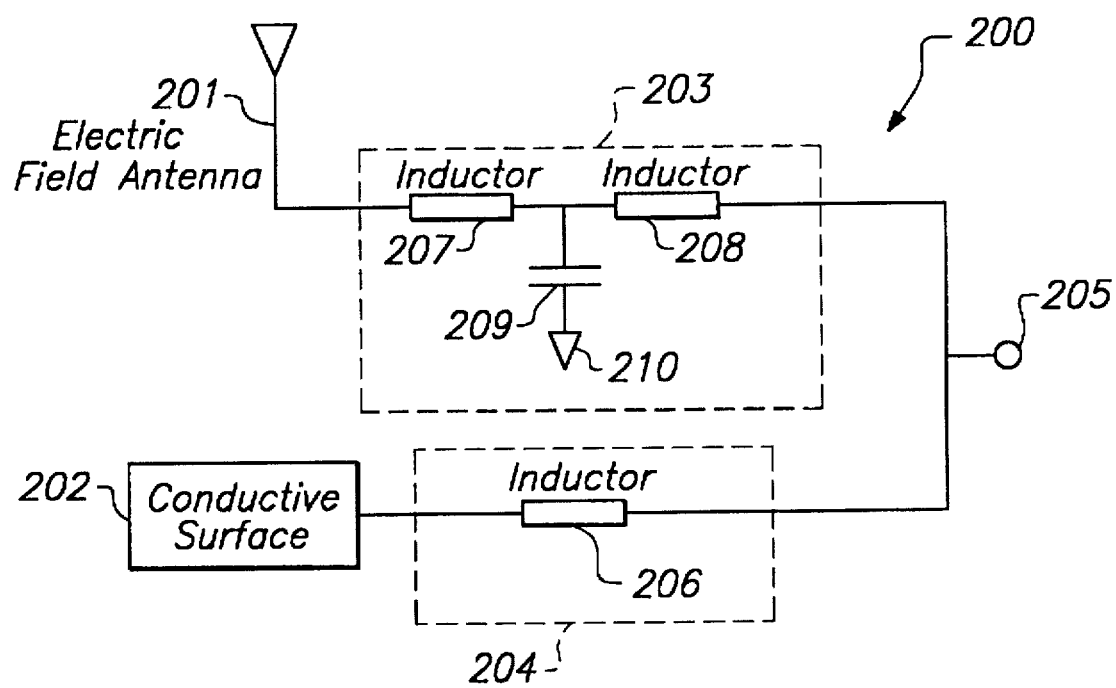
FIG. 2 is a block diagram of a combined monopole and patch antenna circuit in accordance with the present invention.

There is illustrated in the block diagram of FIG. 2, an antenna system 200 for use on portable unit 101 of communication device 100. In accordance with the present invention, antenna system 200 has an electric field antenna 201, a patch antenna 202, matching circuits 203, 204 and antenna port 205. In one embodiment, antenna system 200 transmits and receives signals having a carrier frequency, for example, in the 46–49 MHz range. Alternatively, transmission frequencies around 900 MHz are of particular interest for WET and WHTA applications, and other frequency bands may also be selected for other types of applications.

Electric field antenna 201 is an antenna that is sensitive primarily to changes in electric fields (in contrast to changes in magnetic fields, such as a monopole antenna). Because the electric field component of an electromagnetic field diminishes with proximity to the user's body, electric field antenna 201 is inefficient when located proximate to a user's body.

Matching circuit 203 is an impedance matching network that couples electric field antenna 201 to antenna port 205. Matching circuit 203 tunes electric field antenna 201 to obtain a desired receive sensitivity and a desired transmit field strength. In one embodiment sensitive to the 46–49 MHz transmission frequency range, matching circuit 203 comprises a 0.33 uH inductor 207 serially coupled to a 1.5 uH inductor 208 with a 3 pF shunt capacitor 209 coupling the inductor node to ground 210. Other matching circuits may alternatively be used to operate with different transmission frequencies or to obtain different RF characteristics.

In addition to electric field antenna 201, antenna system 200 also includes patch antenna 202. Patch antenna 202 is a capacitively-coupled antenna that transmits and receives RF signals that capacitively couple to the user's body, or to other conductive objects such as a file cabinet, a metal desk, and the like.

Figure 3:
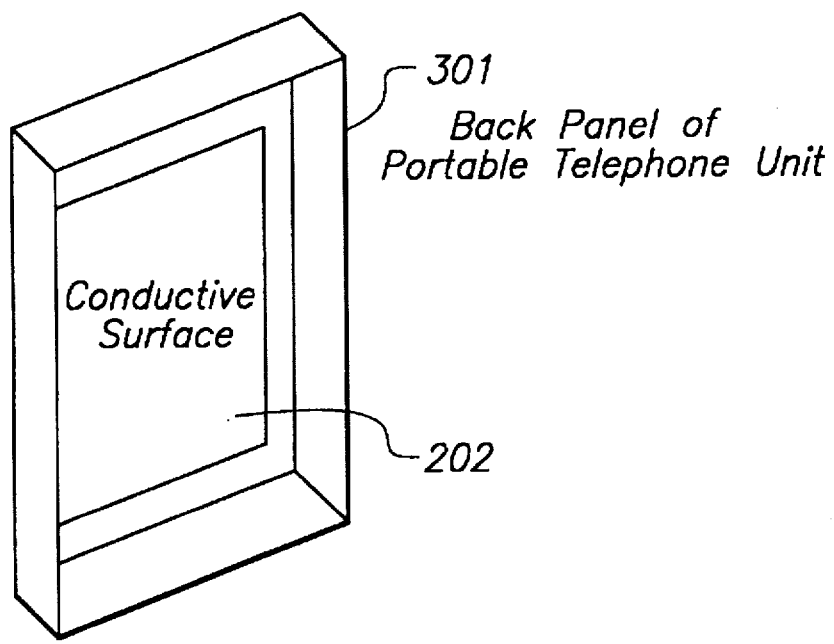
FIG. 3 is a pictorial illustration of a portable unit back panel in accordance with the present invention.

Referring now to FIG. 3, there is illustrated a back panel 301 of portable unit 101. Back panel 301 is a portion of a housing that encloses the communications circuitry of portable unit 101. Patch antenna 202 is coupled to back panel 301, and is dimensioned for capacitively coupling to a human body when located proximate to the human body. In one embodiment, patch antenna 202 is an adhesively mounted 3 inch by 2 inch rectangular layer of conductive copper foil. When capacitively coupled, patch antenna 202 uses the dielectric properties of the human body to receive and/or transmit electromagnetic signals. In this configuration, the user's body is used as a radiation and/or transmission medium. Because patch antenna 202 uses the body as a receiving medium, the combined antennae of the present invention do not require a separate antenna that extends beyond the proximity effects of the body.

Patch antenna 202 may alternatively be formed from wire mesh, a metal plate, a conductive coating applied directly to the back panel or other conductive material. Additionally, patch antenna 202 may be mounted to back panel 301 using screws, pressure clips, fasteners, or other conventional mounting means. Patch antenna 202 capacitively couples to the body of a user whether the exterior of the back panel in direct contact with the user or is separated from the user by several layer's of clothing.

Patch antenna 202 of the illustrated embodiment is dimensioned to fit within back panel 301. The coupling characteristics of patch antenna 202 is determined by the capacitance (C) between patch antenna 202 and the nearby body and is referred to below as "patch capacitance" or "capacitance of the patch antenna." Patch capacitance (C) is approximated by the following equation:

$$C = k * Area / Distance$$

where Area is the surface area of patch antenna 202 and Distance is the distance between patch antenna 202 and the body. K depends on the thickness and characteristics of the dielectric material interposed, the size and shape of the human body the patch is near, and the characteristics of the individual body it is near.

In one embodiment, patch antenna 202 is a two inch by three inch (six square inch) copper foil. With this embodiment, combined antenna 200 is proximate to a user when positioned no more than approximately an inch from a user wearing a single layer of clothing. The capacitance of patch antenna 202 in proximity with the human body is approximately 2 pF or greater, and in the preferred embodiment is 10 pF or greater. Other patch dimensions may be used in accordance with the present invention, for example, to accommodate other back panel sizes or to achieve specific coupling characteristics.

Back panel 301 as shown is formed from a non-conductive material, such as 0.075 inch thick ABS. Other non-conductive materials, such as other plastics, rubber, wood, or the Like may alternatively be used. If a conductive material is used however, to form the back panel 301, then insulating material should be placed between back panel 301 and any attached front panel, in order to electrically isolate the patch antenna thus formed.

Matching circuit 204 tunes patch antenna 202 to obtain a desired receive sensitivity and a desired transmit field strength when antenna system 200 is positioned proximate to a body. In one embodiment for sending and receiving transmission signals in the 46–49 MHz range, matching circuit 204 is a 0.15 uH inductor 206 connected in series between patch antenna 202 and antenna port 205. Other matching circuits 204 may alternatively be used to operate with different transmission frequencies or to obtain different RF characteristics.

Both electric field antenna 201 and patch antenna 202 are coupled through matching circuits 203, 204 to a common antenna port 205. Antenna port 205 couples to the receive and transmit channels of portable unit 101. In one embodiment, matching circuits 203, 204 are selected to match the load impedance and to balance patch antenna 202 and electric field antenna 201. Patch antenna 202 and electric field antenna 201 are balanced when the sensitivity of combined antenna 200 does not vary by more than approximately 25% when located proximate a user as compared to when located away from a user.

In operation, antenna system 200 receives and transmits RF signals when portable unit 101 is located away from a user as well as when worn by a user. When worn by a user, the antenna system 200 is located proximate to the user's body and hence the electric component of the electromagnetic field is attenuated. In this mode of operation, the transmit and receive effects of electric field antenna 201 are negligible compared with the transmit and receive effects of patch antenna 202. Accordingly, patch antenna 202 is the dominant or primary antenna. Conversely, when portable unit 101 is not being worn by a user, electric field antenna 201 is the dominant or primary antenna. When located away from a user and other conductive objects patch antenna 202 provides no capacitive coupling, and without such capacitive coupling the RF effects of patch antenna 202 are negligible compared with the RF effects of electric field antenna 201. Thus, the radiation pattern of electric field antenna 201 is optimized for operation away from a user (not proximate to a body) while the radiation pattern of patch antenna 202 is optimized for operation proximate to a body.

Figure 4:
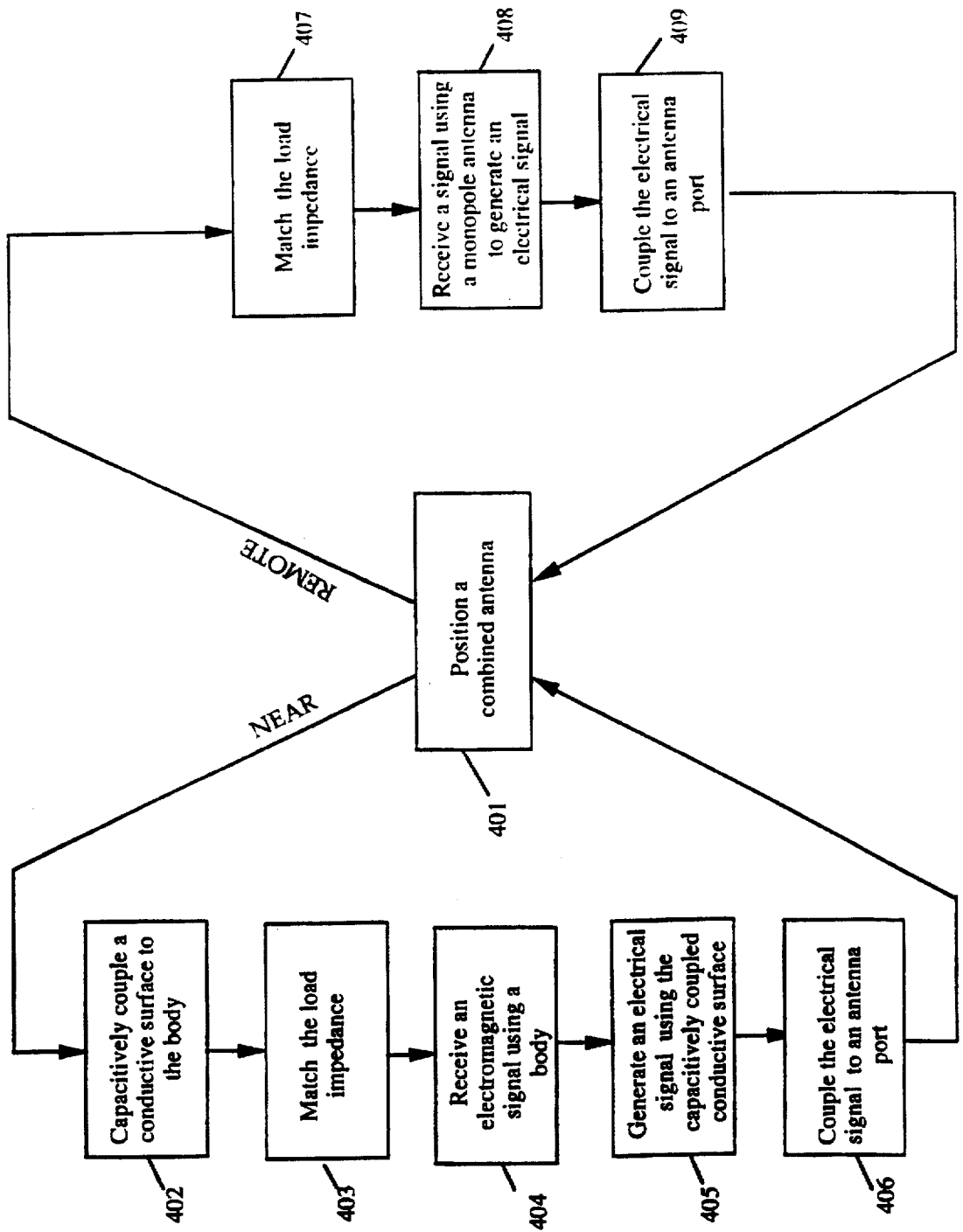
FIG. 4 is a flow diagram of a method for receiving an electromagnetic signal in accordance with the present invention.

FIG. 4 is a flow diagram of a method for receiving an electromagnetic signal in accordance with the present invention. Electromagnetic signals are received by a combined electric field antenna and patch antenna. The combined antenna is positioned 401 either proximate to (near) or away (remote) from a user's body. The combined antenna is positioned 401 proximate to a user's body by placing a portable unit of a communication device employing the combined antenna in the user's pocket, by clipping the portable unit to a belt or neckstrap, or by any other means of positioning the combined antenna adjacent to the user's body. The combined antenna is positioned away from the body by placing the portable unit sufficiently far from the user to inhibit capacitive coupling between the user and the combined antenna. For example, the portable unit may be positioned in a cradle in the base unit, as illustrated in FIG. 1, or separately on a desk, wall, computer, or the like.

When the combined antenna is positioned 401 proximate to the user, the conductive surface of the patch antenna capacitively couples 402 to the user's body. The impedance of the capacitively coupled patch antenna is matched 403 to the characteristic impedance of the antenna port using a matching circuit. When the conductive surface of the patch antenna capacitively couples to the user's body, the user's body becomes a receiving medium that receives 404 an electromagnetic signal for generating 405 an electrical signal corresponding to the received electromagnetic signal. The electrical signal is coupled 406 to an antenna port through the matching circuit.

When the combined antenna is positioned 401 away from the user, the patch antenna does not capacitively couple to the user's body and electromagnetic signals are received using an electric field antenna, for example, configured as a monopole antenna. The impedance of the electric field antenna is matched 407 to the characteristic impedance of the antenna port using a serially-coupled matching circuit. The electric field antenna receives 408 an electromagnetic signal and generates a corresponding electrical signal that is coupled 409 to the antenna port through the matching circuit.

Figure 5:
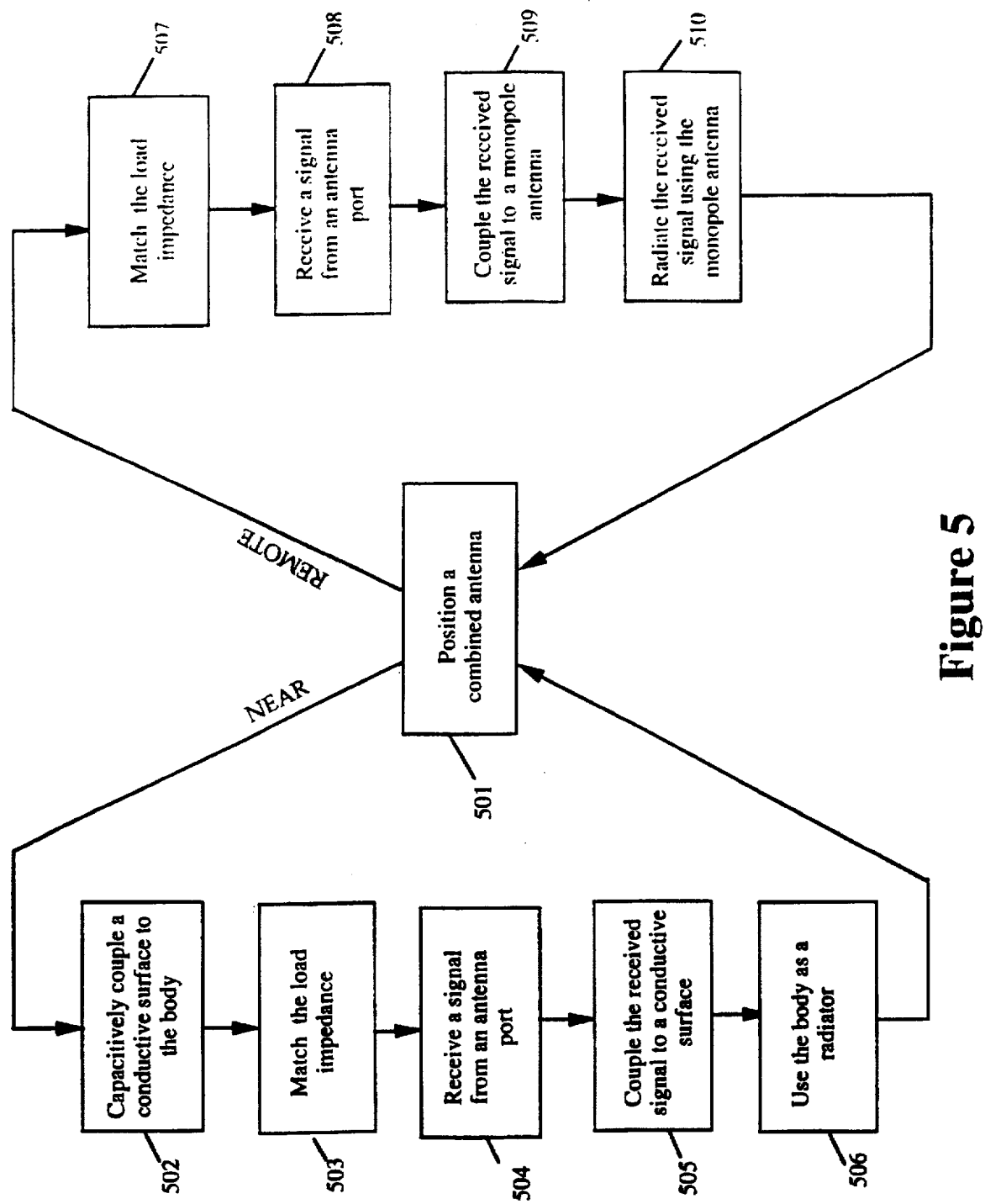
FIG. 5 is a flow diagram of a method for transmitting an electromagnetic signal in accordance with the present invention.

FIG. 5 is a flow diagram of a transmitting (radiating) method in accordance with the present invention. A combined monopole and patch antenna is positioned 501 either proximate to or away from a conductive body such as a user's body or any other conductive object as described above with respect to FIG. 4. When the combined antenna is positioned 501 proximate to the user, the conductive surface of the patch antenna capacitively couples 502 to the user's body. The impedance of the capacitively coupled patch antenna is matched 503 to the characteristic impedance of the antenna port using a matching circuit. An electrical signal is received 504 from an antenna port. The received electrical signal is coupled 505 to the conductive surface of the patch antenna through the matching circuit. With the conductive surface of the patch antenna capacitively coupled to the user's body, the user's body becomes a radiating medium to transmit 506 an electromagnetic signal.

When the combined antenna is positioned 501 away from the user, the patch antenna provides no capacitive coupling and electromagnetic signals are transmitted primarily via the electric field antenna. The impedance of the electric field antenna is matched 507 to the characteristic impedance of the antenna port using a matching circuit. An electrical signal is received 508 from the antenna port and is coupled 509 to the monopole antenna by the matching circuit. The electrical signal is also coupled to the conductive surface of the patch antenna, however, because the patch is not capacitively coupled to a radiating body, the contribution of the patch antenna is negligible. Thus, the received electrical signal is radiated 510 primarily by the monopole antenna.

When the combined antenna is positioned 401, 501 away from a body, the combined antenna does not capacitively couple to the body and thus no electromagnetic signal will be received or transmitted using the body and the electric field sensitive antenna dominates for transmitting and receiving signals. When the combined antenna is positioned 401, 501 proximate to a user's body, the electric field antenna has negligible effect and thus the signal transmission contributed by the electric field antenna is negligible.

By positioning 401, 501 the combined antenna either proximate to or away from a body, antenna switching is effected without using switching circuitry or a mechanical switch. This passive switching between the patch and electric field antennas enables a portable unit to operate with in different operating environments such as proximate to or away from a conductive body.

What is claimed is:

1. In a portable unit having a housing, an apparatus for operating on electromagnetic signals comprising:

an antenna port in the portable unit for coupling to a load having a load impedance;

a conductive surface disposed on the housing for capacitively coupling to a conductive body in close proximity with the portable unit;

an electric field antenna disposed on the portable unit;

a first matching circuit coupling the conductive surface to the antenna port and having an impedance that causes the conductive body to operate as the dominant receiving medium as compared to the electric field antenna when the portable unit is in close proximity with the conductive body; and a second matching circuit for matching the load coupling the electric field antenna to the antenna port.

2. The apparatus of claim 1 wherein:

the first matching circuit comprises a first inductor; and the second matching circuit comprises a T network including serially coupled inductors and a shunt capacitor connected between the serially coupled inductors.

3. The apparatus of claim 1 wherein the electric field antenna is a monopole antenna.

4. The apparatus of claim 1 wherein the conductive surface is substantially rectangular and has approximately three inch length and approximately two inch width.

5. A method for receiving an electromagnetic signal using a portable unit adapted for use in a first operating environment proximate a body and a second operating environment remote from a body, the portable unit having a combined antenna comprising a capacitive coupling element, an electric field sensitive antenna and an antenna port for coupling to a load having a load impedance, comprising the steps of:

positioning the combined antenna in a first location;

responsive to the first location being in the first operating environment performing the steps of:
capacitively coupling the capacitive coupling element to the body; and
using the body as a dominant receiving medium; and responsive to the first location being in the second operating environment using the electric field sensitive antenna as a dominant receiving medium.

6. The method of claim 5 further comprising the step of tuning the electric field antenna to match the load impedance.

7. The method of claim 5 further comprising the step of tuning the capacitive coupling element to match the load impedance when using the body as the dominant receiving medium.

8. The method of claim 5 wherein the electromagnetic signal has a transmission frequency of at least 25 MHz.

9. The method of claim 5 wherein the electromagnetic signal has a transmission frequency range of 46–49 MHz.

10. A method for transmitting a transmission signal using a portable unit adapted for use in a first operating environment proximate a body and a second operating environment remote from a body, the portable unit having a combined antenna comprising a capacitive coupling element, an electric field antenna and an antenna port for coupling to a load having a load impedance, comprising the steps of:

coupling the transmission signal to the capacitive coupling element;

coupling the transmission signal to the electric field antenna;

positioning the combined antenna in a first location;

responsive to the first location being in the first operating environment performing the steps of:
capacitively coupling the capacitive coupling element to the body; and
using the body as a dominant radiator; and responsive to the first location being in the second operating environment using the electric field antenna as a dominant radiator.

11. The method of claim 10 further comprising the step of tuning the electric field antenna to match the load impedance.

12. The method of claim 10 further comprising the step of timing the capacitive coupling element to match the impedance when using the body as the dominant receiving medium.

13. The method of claim 10 wherein the transmission signal has a transmission frequency of at least 25 MHz.

14. The method of claim 10 wherein the transmission signal has a transmission frequency range of 46–49 MHz.

* * * * *

UNITED STATES PATENT AND TRADEMARK OFFICE
CERTIFICATE OF CORRECTION

PATENT NO.    : 5,678,202

DATED         : October 14, 1997

INVENTOR(S)   : CRISTIAN C. FILIMON, STEPHEN M. JACOBS, AND ANAND GUNDAVAJHALA

It is certified that error appears in the above-identified patent and that said Letters Patent is hereby corrected as shown below:

Column 8, line 27, delete the word "timing" and insert in place thereof --tuning--.

Signed and Sealed this

Twenty-third Day of December, 1997

Attest:

BRUCE LEHMAN

*Attesting Officer*   *Commissioner of Patents and Trademarks*